United States Patent [19]

Gruber et al.

[11] Patent Number: 4,545,400

[45] Date of Patent: Oct. 8, 1985

[54] PRESSURE RELIEVING DEVICE

[75] Inventors: Arthur W. Gruber; Loren C. Smith, both of Virginia Beach, Va.

[73] Assignee: The BOC Group, Inc., Montvale, N.J.

[21] Appl. No.: 488,242

[22] Filed: Apr. 21, 1983

[51] Int. Cl.⁴ ............................................. F16K 17/00
[52] U.S. Cl. .................................. 137/467; 137/860; 220/208; 220/366
[58] Field of Search ........... 137/843, 844, 860, 516.15; 220/208, 209, 366; 215/260; 137/467

[56] References Cited

U.S. PATENT DOCUMENTS

| | | | |
|---|---|---|---|
| 3,320,097 | 5/1967 | Sugalski | 137/516.15 |
| 3,363,644 | 1/1968 | Malec | 137/860 |
| 3,633,606 | 1/1972 | Hay et al. | 137/113 |
| 4,317,375 | 3/1982 | Egert | 137/68 R |

Primary Examiner—Martin P. Schwadron
Assistant Examiner—Sheri Novack
Attorney, Agent, or Firm—David A. Draegert; Larry R. Cassett

[57] ABSTRACT

A pressure relieving device for use with gas flowmeters, pressure regulators and other fluid flow equipment is described. The device includes an O-ring and means for compressing and retaining the O-ring to provide a fluid-tight seal under normal operating pressure, but having a gap positioned such that the occurrence of an excessive pressure causes a portion of the O-ring to move into and through the gap to relieve the excessive pressure. A passage for enabling the fluid to contact the O-ring is sized to allow sufficient flow to relieve a fluid pressure substantially in excess of the normal operating pressure.

10 Claims, 3 Drawing Figures

U.S. Patent  Oct. 8, 1985  4,545,400
FIG. 1
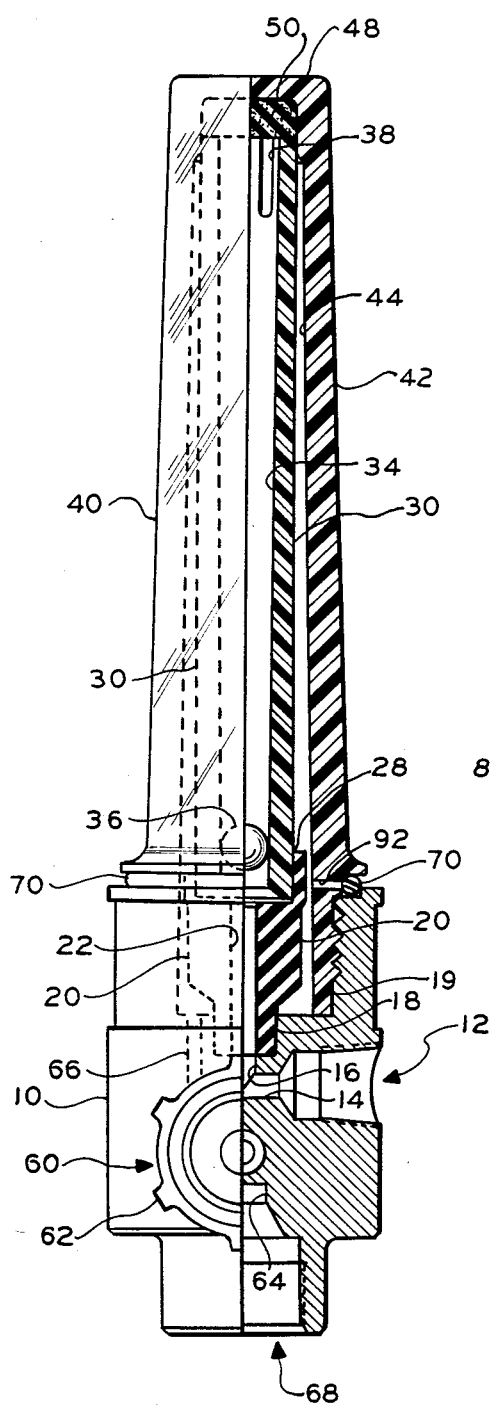
FIG. 2
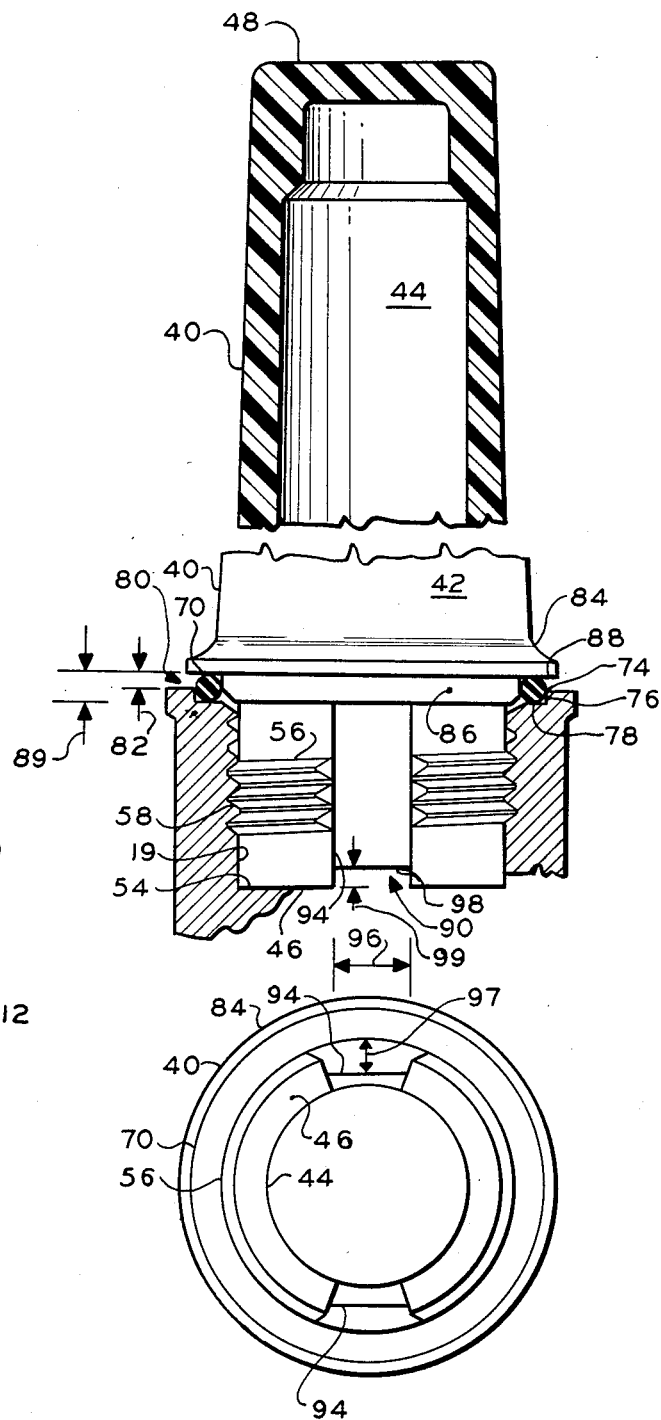
FIG. 3

PRESSURE RELIEVING DEVICE

TECHNICAL FIELD

The invention relates to fluid flow equipment, particularly flowmeters for monitoring and controlling the flow of gas in a gas handling system.

DESCRIPTION OF THE PRIOR ART

Protection of instruments and personnel from the effects of unexpectedly high pressures in fluid handling systems is a long standing problem. Many types of pressure relieving devices are known. Among the most commonly used are valves which are biased closed by a spring or weight which can be overcome by a pressure greater than a chosen value. Bursting disc devices are also known in which a disc of material is ruptured upon the occurrence of a gas pressure substantially in excess of a desired amount.

U.S. Pat. No. 4,317,375 to Egert describes a gas flowmeter which incorporates a bursting disc. The flowmeter comprises a body, flow tube, cover tube and metering valve. The bursting disc closes one end of the flow tube and the cover tube. The cover tube has threads which engage threads on the walls of a recess in the body. A resilient O-ring is used to provide a fluid tight seal between the cover tube and the body. The O-ring is compressed and retained in place between the end of the cover tube and the bottom of a recess in the body. A similar seal is provided between the flow tube and the body. In both situations, every portion of the O-ring is surrounded on three sides by solid walls. The fourth side is open to the gas which tends to keep the O-ring in contact with each of the three walls.

U.S. Pat. No. 3,633,606 to Hay and Thompson discloses an automatic valve for switching from a depleted to a full gas cylinder. This valve includes a check valve comprising a cylindrical plug having a groove around its circumference and a small passageway leading from a large central passageway to the bottom of the groove. An uncompressed O-ring in the groove normally provides a seal of the small passageway but its resiliency enables it to vent gas upon the occurrence of a slight overpressure and to restore the seal when the overpressure is reduced.

SUMMARY OF THE INVENTION

The invention is a pressure relieving device for protecting flowmeters and other fluid instruments from serious damage caused by applied pressures which greatly exceed designed operating pressures. The device includes an O-ring and means for compressing and retaining the O-ring to provide a fluid tight seal under normal operating pressure. The device also includes means having a passage for enabling the fluid to contact the O-ring and sized to allow sufficient flow to relieve a fluid pressure substantially in excess of the normal operating pressure. The O-ring compressing and retaining means has a gap positioned such that the occurrence of an excessive pressure causes at least a portion of the circumference of the O-ring to move into and through the gap whereby the excessive pressure is relieved by fluid flow through the passage and the gap.

The pressure relieving device according to the invention has a predictable and reproducible response to excessive pressures. The release pressure depends upon the size and the composition of the O-ring and the dimensions of the compressing and retaining means and the extrusion gap. The device is simple and inexpensive since a single O-ring performs two functions, i.e. a seal under normal operating pressures and relief under excessive pressure. Further, the O-ring is often reusable and the device is easily and quickly reset to its normal, sealing configuration.

The pressure relieving device of the invention is suitable for application in many situations, particularly in flowmeters and pressure regulators which are widely used in industrial and health care applications.

BRIEF DESCRIPTION OF THE DRAWINGS

FIG. 1 is an elevational view, partially in cross-section of a flowmeter emboding the invention.

FIG. 2 is an elevational view, partially in cross-section of the ends of the casing tube of the flowmeter illustrated in FIG. 1.

FIG. 3 is a plan view of the open end of the casing tube illustrated in FIG. 2.

DESCRIPTION OF THE PREFERRED EMBODIMENTS

FIG. 1 illustrates the flowmeter emboding the invention. The flow meter includes a body 10, and a flow tube 30 which is supported by a flow tube holder 20 and a bumper 50. The flow tube 30 is enclosed by a casing tube 40. An O-ring 70 normally provides a seal between the body and the casing tube. Upon the occurrence of an excessive pressure, a portion of the O-ring extrudes through gap 80 between the body and the casing tube and gas escapes via the gap and a passage 90 leading to sealing surfaces of the O-ring.

The body 10 is made from brass or other suitable material depending upon the nature of the gas. The body has an inlet opening 12 which may be connected to a source of the gas by any suitable means. The inlet opening leads to an inlet passage 14 which may include a central passage 16. The flow tube holder 20 has a central passageway 22 and two open ends which connect to the central passageways of the body and flow tube. One end of holder 20 fits in a recess 18 of the body, and the other end has a recess 28 for receiving flow tube 30. The holder is made from neoprene rubber or other resilient material which seals to both the flow tube and body and provides a shock absorbing mounting for the flow tube.

The flow tube 30 is a conventional rotameter type tube having a vertical, tapered central passageway 34 and a flow rate indicating ball 36 which is free to move along the passageway 34. In order that the location of the ball be visible to an operator, the flow tube 30 is made from a transparent material, such as a polycarbonate. The upper end of the flow tube is closed by a bumper 50 made from a resilient material such as polyurethane or polyester felted foam. The wall of the flow tube has one or more slots 38 near the upper end to allow gas to pass from the interior to the exterior of the flow tube.

The casing tube 40 is also made of clear polycarbonate or other transparent material. The upper end 48 is closed to support bumper 50 and flow tube 30. The lower end 46 is open. Preferably, the outer wall near the end 46 is provided with threads 56 which engage threads 58 on the cylindrical wall 19 of a casing tube recess in the body 10. The inside surface 44 of the casing tube 40, and the outside surface 32 of the flow tube 30 and of the flow tube holder 20 define an annular passageway which leads to a connecting passageway 66 in the body 10 and then to an outlet passageway 64 and outlet opening 68. If gas flow control is desired, the connecting passageway 66 may comprise a metering valve 60 having a nob 64.

At normal operating pressures, O-ring 70 provides a gas-tight seal between the casing 40 and the body 10 of the flowmeter. The O-ring sits in a cylindrical recess having a edge 74 and a cylinderical wall 76. The O-ring is compressed, preferably between the bottom end 78 of this recess and the bottom face 88 of a shoulder ring 84 which extends outward from the outside wall 42 of the casing tube 40. Laterally, the O-ring is retained in position, preferably between a cylindrical portion 86 of the outside wall of tube 40 and the cylindrical wall 76 of the O-ring recess in the body. Thus, the O-ring is positioned in a cavity bounded by sealing surfaces 76, 78, 86 and 88 which should all be smooth and scratch free to prevent leakage paths and scuffing of the O-ring. The separation between the opposing sealing surfaces should be chosen so that the O-ring is normally compressed to provide an appropriate sealing pressure. Preferably, the dimensions of the parts are chosen so that desired separation of the opposing sealing surfaces 78 and 88 is obtained when the open end 46 of the threaded casing tube 40 is stopped by the bottom 54 of the casing tube recess. The height of the wall 76 of the O-ring recess is less than the separation 89 of the upper and lower sealing surfaces 88 and 78, which leaves a cylindrical gap 80 of width 82 between the shoulder face 88 and the edge 74 of the O-ring recess.

A gas flow 90 passage is provided from the interior of the casing tube 40 to the interior sealing surfaces of the O-ring to enable the fluid to contact the O-ring. In one embodiment, shown in FIG. 1, this passage comprises one or more radial holes or slots 92 which connect the inside wall 44 of the casing tube with the O-ring sealing surface 86. An alternative embodiment is shown in FIGS. 2 and 3 where the passage comprises two notches 98 and two grooves 94 which enable gas to contact the O-ring adjacent sealing surfaces 86 and 78. Grooves 94 are deeper than the casing threads 56. They allow gas to flow normal to the threads rather than in the small clearance passageways between adjacent engaging threads 56 and 58.

Upon the occurrence of a gas pressure substantially exceeding the sealing pressure, the gas in contact with the O-ring 70 forces at least a portion of the O-ring to extrude through the gap 80, thus allowing gas to escape through the passage 90 and at least a portion of the gap 80. The portion of the O-ring which extrudes through the gap depends upon the gas pressure and flow and may be only ten percent of its circumference. The preferred embodiments are easily and quickly reset to their sealing configuration by loosening the threaded casing tube, restoring the O-ring to its position in the O-ring recess, and tightening the casing tube to compress the O-ring.

All of the interior passages of a flowmeter must be sized to accommodate the rated flow at the design pressure. For safety reasons, the cross-sectional area and length of the inlet passage 14 are usually chosen to effectively limit the flow through the meter. To ensure pressure relief in the case of an excessive pressure, the minimum area of the gas flow passage 90 to the O-ring sealing surfaces should be at least equal to the area of the inlet passage. Similarly, the dimensions of the extrusion gap 80 should be such that the area of the gap exceeds that of the inlet passage.

O-rings having a wide assortment of dimensions and compositions are readily available from various manufacturers. The maximum fluid pressure which a particular O-ring will seal without leaking depends upon the dimensions and properties of the O-ring and upon the dimensions of its enclosing cavity. Design data for conventional cavities is readily available from O-ring suppliers. The release pressure of a device according to the present invention also depends upon the dimensions and surface conditions of its retaining cavity. The hardness and strength of the O-ring material and the presence of any lubricating or sealing compound are also factors. Proper choice of parameters for a particular application can be easily made with a minimum of routine experimentation. For maximum designed operating pressures of about 5 psig, it is believed that devices can be made which will reliably release a pressure exceeding 50 psig, i.e. more than about 10 times the operating pressure. For operating pressures of 500 psig, it is believed the factor can be reduced to about 5.

A typical flowmeter application is to deliver a flow rate of up to 60 cubic feet per hour (cfh) of argon or carbon dioxide with a gauge pressure at the inlet of 30 pounds per square inch (psig). Such an inlet pressure is frequently obtained by connecting a pressure regulator to a gas cylinder which has an internal pressure up to 2600 psig or more. The brass body of a typical flowmeter may be capable of withstanding pressures in excess of 6000 psig but a the casing tube may have a bursting pressure of about 3000 psig or less. Direct connection of a flowmeter to a gas cylinder without a pressure regulator has caused bursting of flowmeter casing tubes. A pressure relieving device which will release pressures exceeding approximately 400 psig would provide a safety factor of about 7:1.

A particular embodiment of such a flowmeter was constructed in which the internal passageway was a hole having an inside diameter of 0.116 inches and an area of 0.0105 square inches which would effectively limit the maximum flow rate to about 15,000 cfh for an inlet pressure of 2000 psig. The casing tube had two grooves 94 of width 96 of 0.260 inches, and depth 97 of 0.06 inches, which provided a total gas flow area of approximately 0.031 square inches. Two notches 98 had the same width as the grooves, a depth 99 of 0.07 inches, and provided an area of approximately 0.036 square inches.

The O-ring was a model #MS9068-120 supplied by the Acushnet Company. This O-ring was made of silicone rubber and had an inside diameter of 0.99 inches, an outside diameter of 1.19 inches and an uncompressed cross-sectional diameter of 0.10 inches. Such an O-ring was confined in a cavity such as illustrated in FIG. 2 where the cylindrical wall 86 had an outside diameter of 0.99 inches, and the cylindrical wall 76 had an inside diameter of 1.20 inches. The O-ring was coated with a small amount of a silicone lubricant compound, Acushnet #L13237, and compressed between shoulder face 88 and O-ring recess bottom 78 which were separated by a distance 89 of 0.084 inches. Measurements were made for two different widths 82 of the extrusion gap 80 between the shoulder face 88 of casing tube 40 and the edge 74 of the O-ring recess in the body 10. For a gap width of 0.053 inches, the release pressure was in the range of 325 to 640 pounds psig. For gap width of 0.034 inches, the release pressure was 800 to 1000 psig. The gap width was 53% of the uncompressed cross-sectional diameter of the O-ring in the first instance, and 34% and in the second. Higher release pressures could be obtained by use of a narrower gap but a ratio of gap width to uncompressed diameter of about 0.15 is believed to be the practical lower limit for most useful O-ring materials. These tests also revealed that the O-ring was not affected by repeated extrusions through the gap and that it could be reused.

Many other embodiments of pressure relieving devices according to the present invention are possible. One device suitable for use in many applications could be made by replacing the transparent casing tube 40 of the embodiment of FIG. 1 with a simple threaded plug having a shoulder and a passage, such as one or more holes 92, connecting a central passageway with the O-ring sealing surfaces. Further, in certain applications, the O-ring may be compressed between cylindrical surfaces in a radial sealing configuration rather than the face sealing arrangement of FIGS. 1 and 2 where the O-ring is compressed between flat surfaces 88 and 78. The O-ring need not be circular in cross-section or plan view as illustrated in FIGS. 2 and 3, but could have a rectangular, x-shaped or other cross-sectional shape and follow any desired path in plan view. The O-ring extrusion gap could be an opening in one of the sealing surfaces rather than between two surfaces. Numerous other embodiments and variations may be conceived from the teaching of this specification. The scope of the present invention is defined by the following claims.

What is claimed is:

1. A fluid pressure relieving device comprising:
    an O-ring;
    means having a passage for enabling the fluid to contact the O-ring and sized to allow sufficient flow to relieve a fluid pressure substantially in excess of normal operating pressure;
    means for compressing and retaining the O-ring to provide a fluid tight seal for pressures up to at least 50 pounds per square inch and having a gap positioned such that upon the occurrence of an excessive pressure the O-ring moves irreversibly in the gap and the excessive pressure is relieved by fluid flow through the gap and the passage; and
    a flow restrictive means upstream from the gap and sized to limit the fluid flow through the gap and the passage upon the movement of the O-ring.

2. The pressure relieving device of claim 1 wherein the width of the gap is at least 15% of the cross sectional diameter of the uncompressed O-ring.

3. The pressure relieving device of claim 1 further comprising a body and a tube, and wherein the O-ring compressing and retaining means comprise a cylindrical wall and an end surface of a recess in the body, a cylindrical portion of the wall of the tube and an end face of a shoulder which extends from the wall of the tube, and the gap is between the shoulder face and the rim of the wall of the cylindrical recess.

4. The pressure relieving device of claim 3 wherein the passage comprises an opening in the wall of the tube.

5. In a gas flowmeter having a body with an inlet passage, a flow tube, a casing tube which will withstand substantially less fluid pressure than the body, an O-ring, and means for compressing and retaining the O-ring between the casing and the body so as to form a gas-tight seal for gas pressures up to at least 50 pounds per square inch, the improvement comprising:
    means having a passage for enabling gas to contact the O-ring, and sized to allow sufficient gas flow to relieve a gas pressure substantially in excess of the normal operating pressure; and
    wherein the O-ring compressing and retaining means has a gap positioned such that upon the occurrence of an excessive gas pressure, at least a portion of the O-ring moves irreversibly through the gap and the excess gas pressure is relieved by gas flow through the passage and the gap; and
    wherein the inlet is sized to limit the gas flow through the passage and the gap upon the movement of the O-ring.

6. The gas flowmeter of claim 5 wherein the O-ring compressing and retaining means provides a seal for pressures up to at least 400 pounds per square inch.

7. The gas flowmeter of claim 6 wherein the O-ring compressing and retaining means comprises a cylindrical wall and an end surface of an O-ring recess in the body, and an end face of a shoulder which extends from the wall of the casing tube.

8. The gas flowmeter of claim 7 wherein the gap is between the shoulder face and the edge of the wall of the O-ring recess.

9. The gas flowmeter of claim 8 further comprising threads on the casing tube which engage threads on the body and wherein the passage comprises a groove which cuts the casing threads.

10. The gas flowmeter of claim 9 further comprising a cylindrical wall and an end surface of a casing tube recess in the body, and where one end of the casing tube is in contact with the end of the casing tube recess, and the passage further comprises a notch in the end of the casing tube.

* * * * *